United States Patent [19]

Gorman

[11] 4,125,491

[45] Nov. 14, 1978

[54] MODIFIED ISOCYANATE COMPOSITIONS

[75] Inventor: John J. Gorman, Hockessin, Del.

[73] Assignee: E. I. Du Pont de Nemours and Company, Wilmington, Del.

[21] Appl. No.: 801,369

[22] Filed: May 27, 1977

[51] Int. Cl.$^2$ ............................................. C08L 7/00
[52] U.S. Cl. .................................. 260/3; 260/33.6 R; 260/33.6 UB; 260/859 R; 528/49; 528/73; 521/902; 428/424; 428/425
[58] Field of Search ............. 260/77.5 NC, 77.5 MA, 260/77.5 AM, 77.5 AT, 2.5 AW, 77.5 TB, 3, 859 R, 33.6 R, 33.6 UB

[56] References Cited

U.S. PATENT DOCUMENTS

| | | | |
|---|---|---|---|
| 2,683,727 | 7/1954 | Mastin et al. | 260/77.5 TB |
| 2,683,728 | 7/1954 | Mastin et al. | 260/77.5 TB |
| 3,100,759 | 8/1963 | Boussu et al. | 260/77.5 MA |
| 3,860,673 | 1/1975 | Lawrence | 260/77.5 NC |
| 3,926,875 | 12/1975 | Tsugukuni et al. | 260/77.5 TB |
| 3,992,316 | 11/1976 | Pedain et al. | 260/77.5 MA |

OTHER PUBLICATIONS

Saunders et al. – Polyurethanes– I. Chemistry (Interscience) (N.Y.) (1962), p. 120.
Shaw– New Information About Urethane Coatings (Du Pont Technical Bulletin), (1963).

*Primary Examiner*—Melvyn I. Marquis

[57] ABSTRACT

Partially trimerized tolylene diisocyanate is made to react with a secondary aliphatic amine containing 24–36 carbon atoms or a mixture of such amine with an aliphatic alcohol containing 12–24 carbon atoms providing together 0.02–0.25 equivalent of active hydrogen per equivalent of free isocyanate groups. The resulting product is well dispersible in blends of aromatic and aliphatic hydrocarbons. Dispersions containing the above reaction product and an elastomer find application as adhesives or surface-coating compositions.

10 Claims, No Drawings

MODIFIED ISOCYANATE COMPOSITIONS

BACKGROUND OF THE INVENTION

This invention relates to a modified, trimerized tolylene diisocyanate and dispersions thereof suitable for use in adhesive and surface-coating compositions.

U.S. Pat. No. 3,860,673 to Lawrence discloses compositions useful in adhesives and surface coatings and comprising (A) an elastomer, for example, a chloroprene polymer; (B) a partly trimerized polyisocyanate, such as tolylene diisocyanate; and (C) a catalyst which is effective to trimerize (B). The partially trimerized isocyanate is used in an amount sufficient to supply 1–10 weight percent of the free -NCO groups based on the elastomer. Adhesive and coating compositions containing the above components normally require a solvent or dispersing medium. Typical adhesive compositions are rubber cements. Usual dispersing media in such applications are aromatic hydrocarbons, aliphatic ketones or esters, or mixtures of two or more such organic liquids, sometimes also containing aliphatic hydrocarbons. Certain solvents used or suitable in the compositions of U.S. Pat. No. 3,860,673 are hazardous to health, especially aromatic hydrocarbons, or are too expensive for industrial applications. Aliphatic hydrocarbons, which are quite inexpensive and whose vapors do not present a serious health hazard, cannot be used in these dispersions by themselves because of virtually complete insolubility of trimerized polyisocyanates therein. Even simple mixtures of aromatic and aliphatic hydrocarbons are unsuitable for this purpose.

It thus is desirable to provide an adhesive or surface-coating composition based on a trimerized polyisocyanate dispersed in a medium comprising principally a mixture of an aromatic hydrocarbon and an aliphatic hydrocarbon.

SUMMARY OF THE INVENTION

According to the present invention, there is now provided a new composition of matter consisting essentially of the reaction product of 1 equivalent, based on free isocyanate groups, of trimerized tolylene diisocyanate with about 0.02–0.25 equivalent of active hydrogen supplied either by a secondary, aliphatic amine containing 24–36 carbon atoms or by a mixture of such amine with an aliphatic alcohol containing 12–24 carbon atoms, the equivalent percent of amine based on the total eqivalents of active hydrogen being within the range of 10–100; and the isomer proportion of the trimerized tolylene diisocyanate being from 100% 2,4-tolylene diisocyanate to about 80% 2,4- and 20% 2,6-tolylene diisocyanate.

Further, there are provided dispersions of the above novel compositions in mixtures of aromatic and aliphatic hydrocarbons.

DETAILED DESCRIPTION OF THE INVENTION

Trimerization of tolylene diisocyanate usually results in a mixture containing a major proportion of the trimer and a minor proportion of monomeric tolylene diisocyanate. Such mixtures will be sometimes referred to herein as partially trimerized tolylene diisocyanate. The compositions of the present invention will, therefore, normally also contain reaction products of such monomeric tolylene diisocyanate with the active hydrogen compounds. This result is intended, and the presence of neither the monomeric tolylene diisocyanate nor its reaction products will adversely affect the operability of the present invention. It has been determined that, irrespective of the proportion of free -NCO groups in the partially trimerized tolylene diisocyanate, not more than 25% of those free —NCO groups should be allowed to react with the active hydrogen compounds. Otherwise, the mechanical properties of the resulting bonds or coatings will be unsatisfactory. In calculating the proportion of free —NCO groups in the partially trimerized tolylene diisocyanate or of those remaining after reaction with the active hydrogen compounds, no distinction is made between the tolylene diisocyanate trimer and monomeric tolylene diisocyanate remaining in a composition.

Both the secondary amines and the alcohols suitable in the present invention are well known and many are commercially available. The secondary amines are represented by the formula $R_1R_2NH$, where usually $R_1$ and $R_2$ are identical aliphatic hydrocarbon radicals having 12–18 carbon atoms. However, $R_1$ and $R_2$ can be different, so long as the total number of their carbon atoms is within the required range. Such amines are made by well-known methods. The aliphatic alcohols are represented by the formula $R_3CH_2OH$, wherein $R_3$ is an aliphatic hydrocarbon radical having 11–23 carbon atoms. $R_1$ and $R_2$ will thus usually be dodecyl, tridecyl, tetradecyl, pentadecyl, hexadecyl, heptadecyl, or octadecyl, either linear or branched. $R_3$ may be, for example, undecyl, dodecyl, tridecyl, tetradecyl, pentadecyl, hexadecyl, heptadecyl, octadecyl, eicosyl, docosyl, and tricosyl, either linear or branched.

While it already is known to form adducts of isocyanates and active hydrogen compounds, the particular secondary amines and especially their combination with secondary aliphatic alcohols gives unexpected and useful results. When a secondary amine alone is used, the thus modified trimerized diisocyanate disperses readily in solvent systems containing aliphatic hydrocarbons, but the rate of bond development at elevated temperatures in some adhesive compositions may be undesirably slow. When a mixture of amine and alcohol is used, an acceptable rate of bond development is normally achieved. If only an aliphatic alcohol is used, its reaction with trimerized diisocyanate is unacceptably slow, and the solvent dispersibility of the resulting product is poor.

Modification of partially trimerized tolylene diisocyanate with a secondary aliphatic amine or a combination of a secondary aliphatic amine with an aliphatic alcohol is carried out in a conventional manner, reactions of isocyanates with both amines and alcohols being well known. For the purpose of this disclosure, the terms "mixture" and "combination" are used in their broadest sense and means that isocyanate groups must be subjected to a reaction with both the amine and the alcohol. These terms do not imply that the alcohol and the amine must be added or be present in the reaction both at the same time. For practical purposes, when a combination of a secondary amine with an aliphatic alcohol is used, it will be preferable to either have the amine and the alcohol present at the same time or to carry out the reaction with the amine first and with the alcohol next. The amine as well as its reaction product, the corresponding urea, catalyze the reaction of tolylene diisocyanate with alcohols.

Partial trimerization of tolylene diisocyanate can be accomplished in any known manner; for example, in the presence of a catalyst, as described in "Polyurethanes, Chemistry and Technology, Part I", Saunders and Frisch, Interscience Publishers, 1969, pages 94–97. Tetramethylguanidine is a practical catalyst because it can be readily deactivated with benzoyl chloride when the desired degree of trimerization has been reached. Tertiary amines also are suitable catalysts. The concentration of trimer in the resulting mixture of trimerized and monomeric tolylene diisocyanate is best given in terms of degree of trimerization, expressed as percent, and calculated as follows:

Degree of trimerization (%) = 100 × (% NCO of initial tolylene diisocyanate − % NCO of partially trimerized tolylene diisocyanate) ÷ (% NCO of initial tolylene diisocyanate/2).

The degree of trimerization of tolylene diisocyanate in partially trimerized tolylene diisocyanate compositions of the present invention should be about 90–130%. When the degree of trimerization is lower than the lower limit of this range, the relatively large amount of the volatile monomeric diisocyanate remaining would present a substantial health hazard to the user. Above the upper limit of this range, the proportion of free isocyanate groups is quite low and dispersibility becomes poor so that good bonding or coating may be achieved only with difficulty or may require uneconomically large quantities of the partially trimerized tolylene diisocyanate.

Adhesive and coating compositions of the present invention will contain:

(A) an elastomer and
(B) partially trimerized tolylene diisocyanate modified, as described above, with a secondary aliphatic amine or a mixture of a secondary aliphatic amine with an aliphatic alcohol.

Optionally, a catalyst effective to promote urethane formation may also be present to increase the rate of bond development.

Preferred elastomers are homopolymers and copolymers of chloroprene. Other suitable elastomers include natural rubber, styrene-butadiene rubber, acrylonitrilebutadiene rubber, and fluoroelastomers; for example, copolymers of vinylidene fluoride and hexafluoropropene. Suitable blends of any of these may be employed. Still further elastomers which can be used in the adhesive or coating compositions of the present invention include chlorosulfonated polyethylene, isobutylene-isoprene copolymers, ethylenepropylene copolymers, EPDM terpolymers and tetrapolymers, polyacrylates, and polyurethanes.

The catalyst effective to promote urethane formation can be any known catalyst or catalyst mixture. Usually, such catalysts are basic or alkaline compounds or organometallic compounds. Preferred in this case are aliphatic tertiary amines. While virtually any aliphatic tertiary amine would have sufficient catalytic activity, it is preferred to use triethylamine or 2,4,6-tri(dimethylaminomethyl) phenol. The amount of the catalyst is usually 0.01 to 0.5% based on the weight of the final adhesive or coating composition. It is believed that in the compositions of the present invention the catalyst principally promotes a reaction between the partially trimerized tolylene diisocyanate and the elastomer. As in the case of the compositions of U.S. Pat. No. 3,860,673, the adhesive and coating compositions of the present invention can be conveniently used as a two component system, wherein the partially trimerized tolylene diisocyanate forms one component and an elastomer or elastomercatalyst mixtures forms the second component, both components being combined together immediately prior to use. Such a two-component system can be offered commercially, for example, as a pack containing two containers, each of the containers containing one of the above components.

This invention is now illustrated by the following examples of certain preferred embodiments thereof, where all parts, proportions, and percentages are by weight unless otherwise indicated.

EXAMPLE 1

A. Preparation of Trimerized Tolylene Diisocyanate Solution

In an agitated vessel, 40 parts of tolylene diisocyanate (80% 2,4-isomer, 20% 2,6-isomer) is mixed with 60 parts of ethyl acetate; 0.08 parts of 2,4,6-tris(dimethylaminomethyl) phenol is added, and the temperature of the mixture is raised to 65° C. After about 7 hours at 65° C., the NCO content of the mixture has been reduced to 8.7% from an initial value of 19.3%. To stop further trimerization, 0.04 parts of benzoyl chloride is added to the mixture. The trimerized product is cooled and stored in a dry container until required. The decrease in NCO content corresponds to a degree of trimerization of 110%.

B. Modification of Trimerized Tolylene Diisocyanate Solution

Portions of the solution prepared in Part A are modified by the addition of minor amounts of various amines and/or alcohols as shown in Table I. The modification involves adding the amine to the trimer solution which is preheated to 60°–70° C., stirring to 10–15 minutes, adding the alcohol, stirring for 10 minutes and allowing the resulting mixture to stand for 3 hours at 60° C. The mixture is then allowed to cool to about 25° C. and is stored for about 12 hours before use. Solid amines and alcohols are melted by heating to about 80° C. prior to addition. In certain control runs, the addition of an amine or an alcohol is omitted and the corresponding process steps in the above modification procedure are also omitted.

C. Evaluation of Dispersibility in Mixed Toluene/Heptane Solvents

Mixed solvents containing varying amounts of toluene and heptane are prepared. To 100 gram portions of the mixed solvents, 7 grams of the modified trimer solutions (40% solids) prepared in Part B are added and the resulting mixtures are shaken for 30 seconds. The resulting dispersions are allowed to stand for 2 hours, at which time the volume fraction of solvent in which the dispersed polyisocyanate remains is measured. If there is no clear supernatent solvent layer, dispersibility is considered excellent, and reported as 100%. If dispersibility is poor, there will be a large volume of clear solvent over a layer of partially settled dispersion, and dispersibility will be reported as a value substantially below 100%. For control purposes, unmodified trimer solution is included in Table I.

The results of Table I are obtained in two series of runs, labeled Series I and Series II, and comparison of data preferably is made within a given series because different preparations of trimerized 2,4-tolylene diisocyanate solution are used in Series I and II. Both preparations of trimerized diisocyanate are made by the procedure of Part A and contain 8.7% by weight NCO groups.

With the exception of runs 1 to 6 the modified samples of trimer solution listed in Table I contain equivalent total amounts of amine and alcohol, 0.0267 equivalent, calculated to consume 13% of the NCO groups in the starting trimer solution.

TABLE I

Dispersibility Of Modified Toluene Diisocyanate Trimer (80/20 Isomer Mixture)

| Run | Amine | Parts of[3] Amine | Parts of[3] Cetyl Alcohol[1] | Dispersibility in (Toluene/Heptane) Volume, % Dispersion | | | | | |
|-----|-------|-------------------|------------------------------|---|---|---|---|---|---|
|     |       |                   |                              | 100/0 | 90/10 | 80/20 | 75/25 | 70/30 | 60/40 |
| Series I |
| 1 | — | — | — | 66.7 | 55.0 | 50.0 | 36.3 | — | — |
| 2 | dibutylamine | 0.662 | 5.0 | 84.2 | 79.7 | 66.7 | — | 53.9 | 43.5 |
| 3 | piperidine | 0.437 | 5.0 | 89.2 | 77.6 | 54.3 | — | 42.3 | 33.3 |
| 4 | dibutylamine | 0.519 | 5.0 | 86.7 | 82.2 | 78.2 | — | 59.5 | 54.1 |
| 5 | dilaurylamine[2] | 2.0 | 5.0 | 81.1 | 78.9 | 100 | — | 100 | 100 |
| 6 | — | — | 5 | 71.4 | 63.4 | 50.0 | — | 37.3 | 43.2 |
| Series II |
| 7 | dilaurylamine | 10.4 | — | 100 | 100 | 100 | 100 | — | — |
| 8 | dilaurylamine | 8.4 | 1.2 | 100 | 100 | 100 | 100 | — | — |
| 9 | dilaurylamine | 5.1 | 3.1 | 85+ | 100 | 100 | 100 | — | — |
| 10 | dilaurylamine | 2.0 | 5.0 | 50.5 | 62.6 | 76.0 | 77.0 | — | — |
| 11 | — | — | 6.2 | 55.0 | 66.7 | 62.8 | 55.5 | — | — |

[1]Alfol C-16 - $C_{16}$ fatty alcohol, hydroxyl number of 242. Conoco Chemical Co.
[2]Armeen 2C - $C_{24}$ fatty secondary amine, combining weight of approximately 390. Armak Chemical Co.
[3]Parts per 100 parts of 40% trimer solution The results indicate that chemically equivalent amounts of low molecular weight amines are less effective than dilauryl amine for improving dispersibility. For mixtures of amine and alcohol, dispersibility increases as the ratio of amine to alcohol is increased.

EXAMPLE 2

A. Preparation of Trimerized Tolylene Diisocyanate Solution

The procedure of Example 1, Part A is repeated with the exception that 2,4-tolylene diisocyanate is used in place of the mixed isomers of tolylene diisocyanate.

B. Modification of Trimerized Tolylene Diisocyanate Solution

The procedure of Example 1, Part B is followed to prepare modified trimer solutions.

C. Evaluation of Dispersibility in Mixed Toluene/Heptane Solvents

The procedure of Example 1, Part C is employed.

D. Evaluation of Dispersibility in Polychloroprene Adhesive

A cement is prepared by dissolving 15 parts of adhesive grade polychloroprene in 59.5 parts of toluene and 25.5 parts of heptane (70/30 by weight toluene/heptane). To 100 g portions of cement, 7 g of modified trimer solution is added and stirred until the mixture is uniform. After the mixture has stood for 1 hour, a thick coat of cement is brushed on poly(ethylene terephthalate) film, allowed to dry, and observed for particulate matter and clarity.

Relevant experimental details and results are given in Table II-A.

TABLE II-A

DISPERSIBILITY OF TRIMERIZED 2,4-TOLYLENE DIISOCYANATE

| Parts Dilaurylamine[1,3] | Parts Cetyl Alcohol[2,3] | % Dispersed in Toluene/Heptane Blends | | | | | Adhesive Film Clarity |
|---|---|---|---|---|---|---|---|
| | | 100 | 90/10 | 80/20 | 70/30 | 60/40 | |
| — | — | 56.2 | 52.5 | 41.2 | 27.7 | 21.0 | White Ppt. - Rough |
| — | 6.2 | 50.0 | 60.0 | 55.3 | 47.0 | 31.5 | Clear |
| 2 | 5 | 51.3 | 60.9 | 94.1 | 97.6 | 94.1 | Clear |
| 5.1 | 3.1 | 51.2 | 62.5 | 85.4 | 94.1 | 88.9 | Clear |
| 8.4 | 1.2 | 100 | 100 | 100 | 100 | 100 | Clear |
| 10.4 | — | 93.3 | 100 | 100 | 100 | 100 | Clear |

[1]Armeen 2C - $C_{24}$ amine, combining weight of approx. 390 g, Armak Chemical Co.
[2]Alfol C-16 - $C_{16}$ alcohol, Hydroxyl No of 242, Conoco Chemical Co.
[3]Parts per 100 parts of 40% trimer solution The results of dispersibility in mixed toluene/heptane solvents again show improvement as the ratio of amine to alcohol increases. In the adhesive film clarity test, all of the modified trimer solutions gave acceptable results.

E. Adhesion Tests in a Polyurethane Cement

A polyurethane cement is prepared from the following materials:

| | Parts |
|---|---|
| Hydroxyl-terminated polyurethane prepared by a reaction of 9 parts of poly(butylene adipate) glycol, mol.wt.approx. 2000, with 1 part of tolylene diisocyanate | 100 |
| Chlorinated natural rubber chlorine content 64–65% | 10 |
| Methyl ethyl ketone | 280 |
| Ethyl acetate | 70 |

To 100 g portions of the polyurethane cement, 7 g of various modified trimer solutions are added; the mixtures are allowed to stand 30 minutes and then used to prepare bonds between 1-in. strips of freshly buffed high styrenebutadiene copolymer shoe soling ("Neolite") and solventwiped plasticized polyvinyl shoe upper material with a fabric backing. Two coats of cement containing the modified trimer solution are applied to each of the substrates and allowed to dry for 25 minutes at room temperature. The adhesive layers are heat-reactivated for 40 seconds at 80° C. and pressed together for 20 seconds at 45 psi. Specimens are tested 30 min., 60 min., 24 hours and 7 days after bonding. The specimens are pulled apart on an Instron tester at a cross-head speed of 2 in/min. The results of these tests are listed in Table II-B.

diisocyanate solution with mixtures of long chain secondary amines and fatty alcohols

TABLE II-B
VINYL/NEOLITE PEEL BONDS - POLYURETHANE ADHESIVE

| Trimer Solution | | 23° C Peel Strength (pli) | | | | 70° C Peel Strength (pli) | | |
|---|---|---|---|---|---|---|---|---|
| Parts[1] Dilauryl Amine | Parts[2] Cetyl Alcohol | 30' | 60' | 24 Hr | 7 Days | 30' | 60' | 24 Hr |
| — | — | 8.6 | 9.9 | 19.4 | 13.7 | 4.4 | 3.9 | 7.4 |
| — | 6.2 | 11.4 | 12.8 | 25.0 | VF | 3.9 | 4.9 | 8.6 |
| 2.0 | 5.0 | 11.3 | 12.8 | VF[3] | VF | 5.3 | 4.4 | 7.7 |
| 5.1 | 3.1 | 14.2 | 13.6 | VF | VF | 4.8 | 4.5 | 7.9 |
| 10.4 | — | 13.2 | 13.1 | VF | 11.0 | 1.5 | 1.7 | 10.6 |

[1]Armeen 2C - $C_{24}$ amine, combining weight of 390 g, Armak Chemical Co.
[2]Alfol C-16 - $C_{16}$ alcohol, Hydroxyl No. of 242, Conoco Chemical Co.
[3]VF indicates vinyl delamination from cloth backing (substrate failure, rather than bond failure).

The results indicate that the adhesives containing trimer solution modified with both amine and alcohol yield bonds at least equivalent to the control employing unmodified trimer solution. The use of the amine alone as a modifier diminishes the rate of bond development at 70° C.

EXAMPLE 3

A. Preparation of Trimerized Tolylene Diisocyanate Solution

The procedure of Example 2, Part A is repeated to prepare this solution.

B. Modification of Trimerized Tolylene Diisocyanate Solution

The procedure of Example 1, Part B is followed to prepare the solutions listed in Table III-A.

C. Evaluation of Dispersibility in Mixed Tolylene/Heptane Solvents

The procedure of Example 1, Part C is employed.

D. Evaluation of Dispersibility in Polychloroprene Adhesive

The procedure of Example 2, Part D, is used for this test.

Relevant experimental details and results are given in Table III-A.

E. Adhesion Tests in a Polychloroprene Cement

A neoprene cement is prepared as follows:

| | Parts |
|---|---|
| Polychloroprene, adhesive grade | 100 |
| Isobutylated p-phenylphenol | 2 |
| Magnesium Oxide | 4 |
| Zinc Oxide | 5 |
| Terpene-modified phenolic resin ("Durez" 12603 from Durez Plastics Division, Hooker Chemical Corp., NY) | 30 |
| Toluene | 317 |
| Hexane | 106 |

To 100 g portions of the polychloroprene cement, 7 g of various modified trimer solutions are added; the mixtures allowed to stand 30 minutes and then are used to prepare bonds between 1-in. strips of freshly buffed high styrene-butadiene copolymer shoe soling ("Neolite"). Two coats of the cement containing the trimerized tolylene diisocyanate solutions are applied to each of the substrates and allowed to dry 15 min. at room temperature. The adhesive layers are heat-reactivated for 30 1 sec. at 80° C. and the strips are pressed together for 30 sec. at 60 psi. The specimens are pulled at 2 in/min. Results are given in Table III-B.

TABLE III-B
PEEL STRENGTH OF MODIFIED 2-4 TOLYLENE DIISOCYANATE TRIMER SOLUTION IN POLYCHLOROPRENE CEMENT

| Composition of Polyisocyanate Solution[1] | | | Peel Strength (pli) (Neolite/Neolite Bonds) | | | | | | | |
|---|---|---|---|---|---|---|---|---|---|---|
| Amine | Grams of Amine | Grams of Cetyl Alcohol[3] | Peel Strength, 23° C | | | | Peel Strength, 70° C | | | |
| | | | 30' | 60' | 24 Hr | 7 Days | 30' | 60' | 24 Hr | 7 Days |
| — | — | — | 3.3 | 5.1 | 15.9 | 39 | 2.0 | 2.4 | 6.4 | 8.6 |
| Dilaurylamine[2] | 2.0 | 5.0 | 5.1 | 5.4 | 21.6 | 32 | 1.6 | 2.1 | 5.4 | 7.4 |
| Distearylamine[4] | 2.0 | 5.0 | 5.8 | 6.5 | 21.0 | 35 | 1.8 | 1.8 | 5.9 | 9.2 |

[1]7.0 grams of 40% trimer solution was mixed in 100 grams of adhesive
[2]Armeen 2C - $C_{24}$ amine, combining weight of approx. 390 g, Armak Chemical Co.
[3]Alfol C-16 - $C_{16}$ alcohol, Hydroxyl No. of 242, Conoco Chemical Co.
[4]Armeen 2HT - $(C_{18}H_{37})_2NH$ combining weight 490-515, Armak Chemical Co.

TABLE III-A
DISPERSIBILITY OF MODIFIED 2-4 TOLYLENE DIISOCYANATE TRIMER

| Polyisocyanate Composition[1] | | | % Dispersed in Toluene/Heptane | | | | | |
|---|---|---|---|---|---|---|---|---|
| Amine | Grams of Amine | Grams of Cetyl Alcohol[2] | Toluene | Blend Ratio - (tol/Hept.) 90/10 | 80/20 | 70/30 | 60/40 | Film Clarity |
| — | — | — | 69 | 50 | 29 | 21 | 19 | Clear-Rough |
| Dilaurylamine[3] | 2.0 | 5.0 | 48 | 77 | 80 | 83 | 100 | Clear |
| Distearylamine[4] | 2.0 | 5.0 | 25 | 64 | 100 | 100 | 33 | Clear |

[1]Weights based on 100 grams of trimerized solution
[2]Alfol C-16 - $C_{16}$ alcohol, Hydroxyl No. of 242, Conoco Chemical Co.
[3]Armeen 2C - $C_{24}$ secondary amine, combining weight of approx. 390 g, Armak Chemical Co.
[4]Armeen 2HT - De(hydrogenated tallow) amine, $(C_{18}H_{37})_2NH$, combining weight 490-515 g, Armak Chemical Co.

Table III-A demonstrates improvement in dispersibility provided by modification of trimerized tolylene The results show that the peel strength of the cements containing the modified trimer solution are essentially equivalent to those obtained with cement containing unmodified trimer solution.

I claim:

1. As a composition of matter, a product of a reaction of one equivalent of tolylene diisocyanate trimerized to a degree of about 90–130% containing at least about 80% of the 2,4-isomer and at most 20% of the 2,6-isomer with about 0.02–0.25 equivalent, based on free isocyanate groups, of active hydrogen supplied either by a secondary, aliphatic monoamine containing 24–36 carbon atoms or a mixture of such amine with an aliphatic monofunctional alcohol containing 12–24 carbon atoms, the relative equivalent percent of amine based on the total equivalents of active hydrogen being within the range of about 10–100.

2. A composition comprising (A) a natural or synthetic elastomer and (B) a composition of claim 1.

3. A composition of claim 2 wherein the elastomer is a homopolymer or copolymer of chloroprene.

4. A pack comprising two containers for use in production of the elastomeric composition of claim 2, one of said containers containing the elastomer or the elastomer and the catalyst and the other part containing the reaction product of trimerized tolylene diisocyanate with a secondary aliphatic monoamine or a mixture of such amine with an aliphatic monofunctional alcohol.

5. A composition of claim 2 containing a liquid solvent consisting essentially of a blend of an aromatic hydrocarbon and of an aliphatic hydrocarbon, the weight proportion of the aromatic hydrocarbon to the aliphatic hydrocarbon being approximately 90:10 to 60:40.

6. A composition of claim 5 which also contains a catalyst effective to promote urethane formation.

7. A composition of claim 6 wherein the proportion of the catalyst is 0.01 to 0.5 weight percent.

8. A composition of claim 6 wherein the catalyst is a tertiary amine.

9. A composition of claim 8 wherein the catalyst is triethylamine or 2,4,6-tri(dimethylaminomethyl)phenol.

10. A composition of claim 5 wherein the aromatic hydrocarbon is toluene and the aliphatic hydrocarbon is heptane.

* * * * *